United States Patent [19]

Heki et al.

[11] 4,119,417
[45] Oct. 10, 1978

[54] GAS SEPARATOR

[75] Inventors: Hideaki Heki, Kawasaki; Osamu Ozaki; Masayoshi Ohno, both of Yokohama, all of Japan

[73] Assignee: Tokyo Shibaura Electric Co., Ltd., Kawasaki, Japan

[21] Appl. No.: 742,239

[22] Filed: Nov. 16, 1976

[30] Foreign Application Priority Data

Nov. 17, 1975 [JP] Japan .................. 50-137280

[51] Int. Cl.² ............................................. B01D 53/22
[52] U.S. Cl. ........................................ 55/158; 55/16; 55/66
[58] Field of Search ............... 55/16, 66, 158; 210/22, 210/23 H, 23 F, 321 R, 433 M

[56] References Cited

U.S. PATENT DOCUMENTS

| | | | |
|---|---|---|---|
| 2,862,575 | 12/1958 | Birdwhistell et al. | 55/16 |
| 2,966,235 | 12/1960 | Kammermeyer | 55/16 |
| 3,208,197 | 9/1965 | Simon et al. | 55/16 |
| 3,246,449 | 4/1966 | Stern et al. | 55/16 |
| 3,303,105 | 2/1967 | Konikoff et al. | 55/16 X |
| 3,472,765 | 10/1969 | Budd et al. | 210/23 F X |
| 3,651,618 | 3/1972 | Klein et al. | 55/16 |
| 3,792,570 | 2/1974 | Biondi et al. | 55/16 |
| 3,961,917 | 6/1976 | Benedict et al. | 55/16 |
| 4,000,065 | 12/1976 | Ladha et al. | 210/23 F |

Primary Examiner—Charles N. Hart
Assistant Examiner—Robert H. Spitzer
Attorney, Agent, or Firm—Oblon, Fisher, Spivak, McClelland & Maier

[57] ABSTRACT

A gas separator which comprises a first separation cell provided with a membrane; a second separation cell similarly fitted with a membrane; a feed pipe for conducting a gas mixture being separated to a high pressure chamber of the first separation cell; a leadout pipe for drawing off from the first separation cell either the gas which has permeated the membrane of the first separation cell or that which has not passed through the membrane thereof; a connection pipe for carrying the other gas from the first separation cell to the high pressure chamber of the second separation cell; a feedback pipe for returning to the feed pipe either the gas which has permeated the membrane of the second separation cell or that which has not flowed through the membrane; and a discharge pipe for removing the other gas from the second separation cell.

10 Claims, 3 Drawing Figures

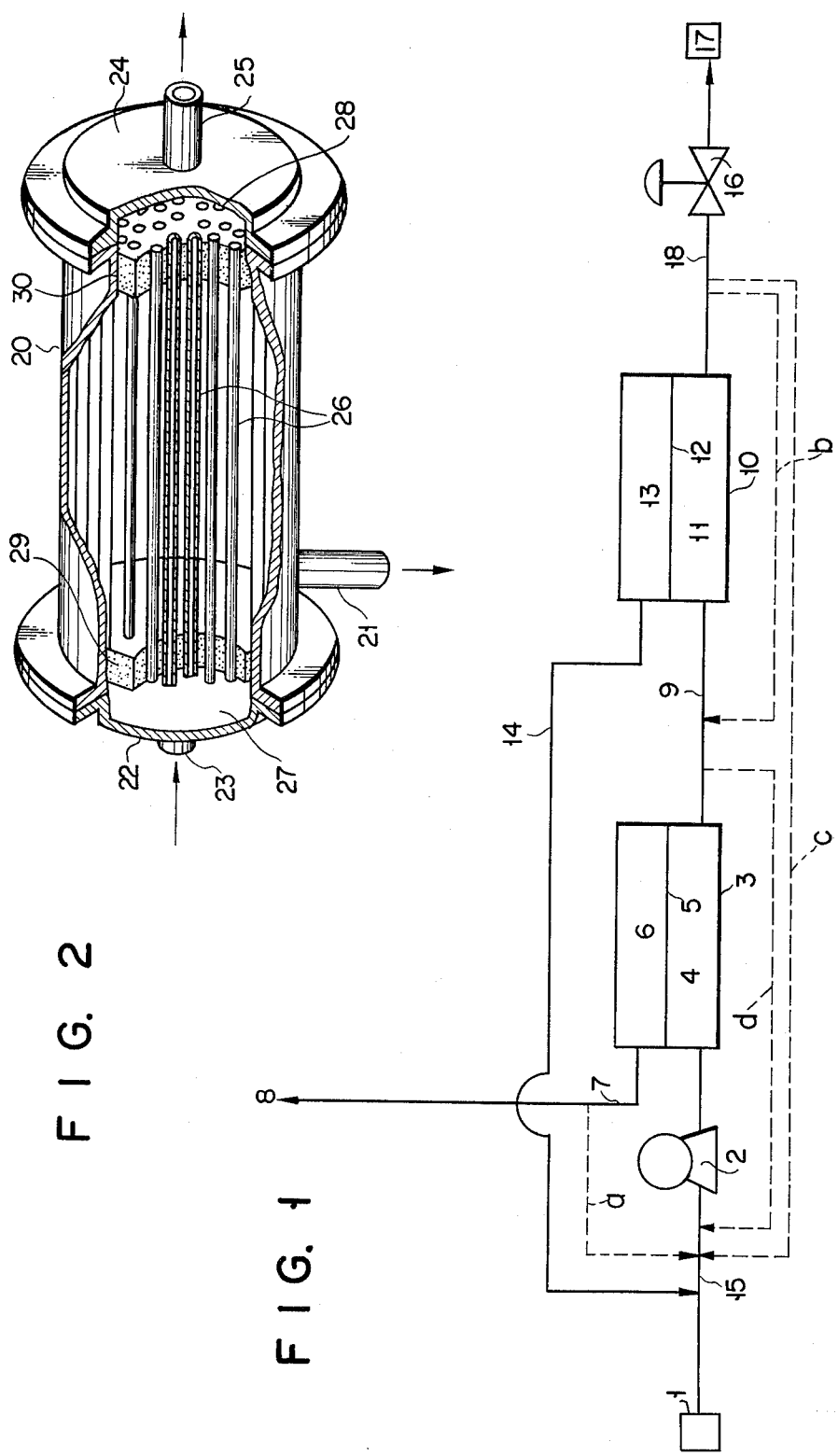

GAS SEPARATOR

BACKGROUND OF THE INVENTION

1. Field of the Invention

This invention relates to a gas mixture separator provided with a membrane, and more particularly to a gas mixture separator provided with two separation cells, each fitted with a memberane, namely the type which provides an enriched gas by separation and the type which provides a diluted gas by separation.

2. Description of the Prior Art

A separation cell of a gas mixture separator known to date is the type which is provided with one or two kinds of membrane. Membranes used include a silicone rubber membrane, palladium membrane, polytetrafluoroethylene membrane and cellulose acetate membrane.

A separation cell provided with one kind of membrane and a separation cell fitted with two kinds of membrane, which have been used in the past, have the drawback that both types of separation cell still have a small separation factor, making it necessary to arrange a large number of separation cells in the cascade form in order to produce a gas of sufficiently high or low concentration. Therefore, it has been demanded to develop a gas mixture separator having a large separation factor.

SUMMARY OF THE INVENTION

It is accordingly the object of this invention to provide a gas mixture separator comprising a separation cell mainly intended for enrichment and another primarily designed for dilution, both of which can most effectively utilize the intrinsic gas-separating capability of a membrane (said capability is indicated, for example, by a separation factor and permeability) and the elevated gas separation performance due to their flow patterns.

According to an aspect of this invention, there is provided a gas mixture separator which comprises a first separation cell provided with a membrane; a second separation cell similarly fitted with a membrane; a feed pipe for conducting a separated gas mixture to a high pressure chamber of the first separation cell; a leadout pipe for drawing off from the first separation cell either the gas which has permeated the first membrane or that which has not passed through the first membrane; a connection pipe for carrying the other gas from the first separation cell to the high pressure chamber of the second separation cell; a feedback pipe for returning to the feed pipe either the gas which has permeated the second membrane or that which has not passed through the second membrane; and a discharge pipe for removing the other gas from the second separation cell.

BRIEF DESCRIPTION OF THE DRAWING

FIG. 1 is a flow sheet schematically illustrating a gas mixture separator embodying this invention;

FIG. 2 is a perspective view, partly in section, of a separation cell used with the gas mixture separator of the invention.

DETAILED DESCRIPTION OF THE PREFERRED EMBODIMENTS

Figure 3:
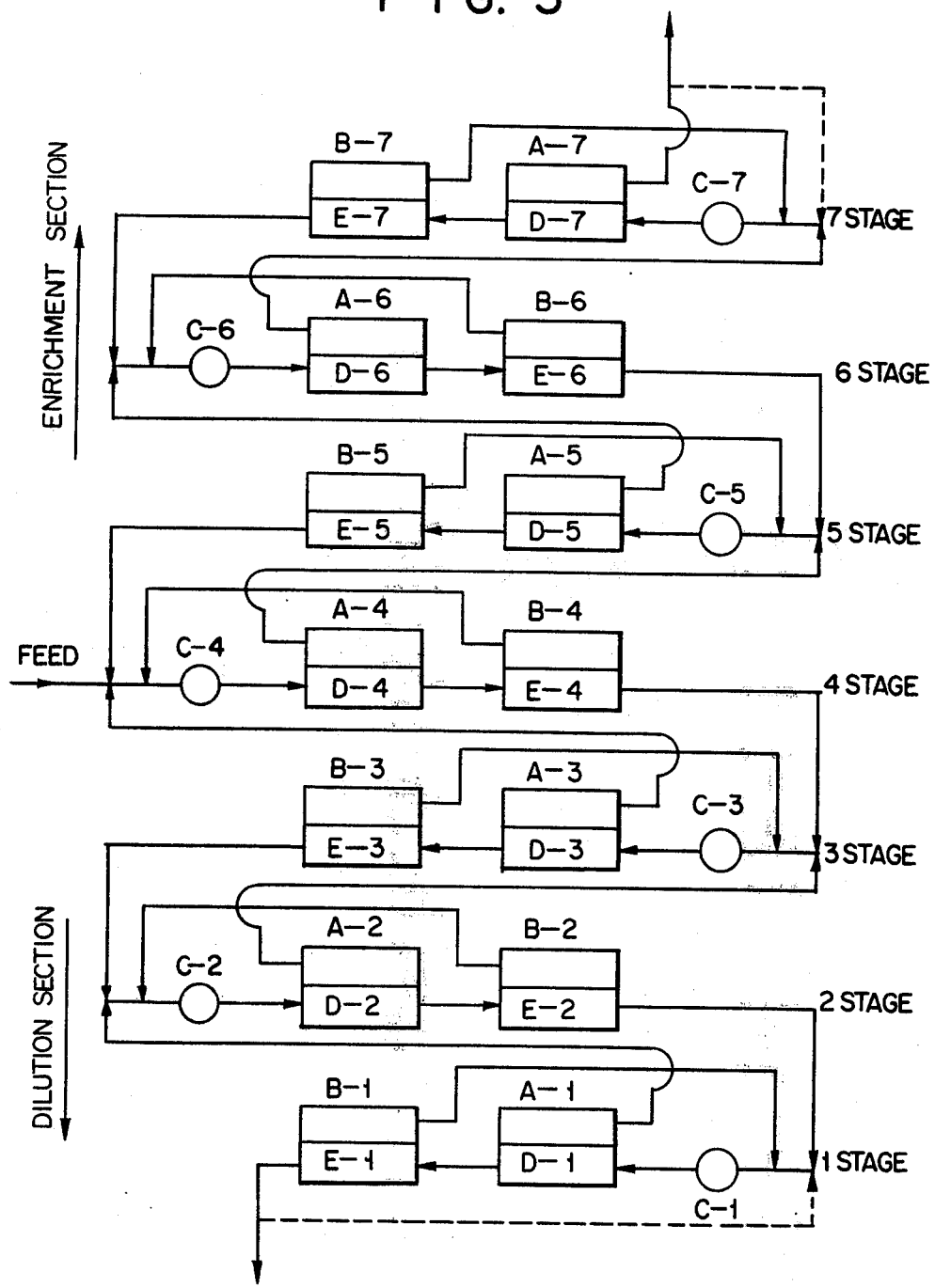
FIG. 3 is a flow sheet of a plurality of gas mixture separators of FIG. 1 arranged in a cascade form.

With the gas mixture separator of this invention, an enriched separated gas is drawn off from the first separation cell and a diluted separated gas is taken out of the second separation cell or vice versa. The subject separator can have a variety of types, depending on whether a gas permeates or does not permeate a membrane, that is, from the high or low pressure chamber of a separation cell. With the withdrawal of gases from the high and low pressure chambers of the first and second separation cells, the following four cases may be considered;

(1) a gas is taken out of the low pressure chamber of the first separation cell and the high pressure chamber of the second separation cell;

(2) a gas is discharged from the high pressure chamber of the first separation cell and the low pressure chamber of the second separation cell;

(3) a gas is drawn off from the high pressure chamber of both first and second separation cells; and (4) a gas is removed from the low pressure chamber of both first and second separation cells.

The above-mentioned first and second items (1), (2) represent alike the case where the membrane of the first separation cell and the membrane of the second separation cell have the same gas-permeating tendencies. The third and fourth items (3), (4) denote alike the case where the membranes of the first and second separation cells have opposite gas-permeating tendencies.

There will now be described by reference to the appended drawings a typical embodiment of this invention, that is, the above-mentioned first case (1).

A gas mixture separator schematically illustrated in FIG. 1 comprises a combination of two separation cells having the same gas-permeating tendencies, namely, the type which produces an enriched gas by separation (hereinafter referred to as "an enrichment separation cell") and the type which provides a diluted gas by separation (hereinafter referred to as "a dilution separation cell"). A gas mixture being treated is supplied from a gas mixture source 1 and is brought into a high pressure chamber 4 of a first separation cell 3 in a state pressurized to a prescribed level by a pump 2. Part of the gas entering the high pressure chamber 4 of the first separation cell 3 permeates a membrane 5 of the cell 3 and is carried into its low pressure chamber 6 and then into a separated gas receptacle 8 disposed in the concentration side of the subject gas mixture separator through a leadout pipe 7. On the other hand, the gas which has not passed through the membrane 5 of the first separation cell 3 is conducted through a connection pipe 9 into a high pressure chamber 11 of a second separation cell 10. Part of the gas entering the high pressure chamber 11 of the second separation cell 10 flows through its membrane 12 into its low pressure chamber 13, and then back into a feed pipe 15 through a feedback pipe 14, converging with a fresh batch of the untreated gas mixture delivered from the gas mixture source 1. The gas which has not passed through the membrane 12 of the second separation cell 10 flows through a discharge pipe 18 and pressure-reducing valve 16 into a separated gas receptacle 17. Thus, components of a gas mixture sent forth from the source 1 are separated in the enriched and diluted forms. The foregoing description refers to the case where the membranes 5, 12 of the first and second separation cells 3, 10 are of the type which enables the target component of a gas mixture being treated to be enriched by permeation. However, it is also possible to separate the components of a gas mixture, even where a membrane designed for dilution is applied. In this case, the difference is that the enrichment and dilution sides of a gas mixture separator are reversed from the first mentioned case.

There will now be given numerical data relative to the parts of the subject gas mixture separator of FIG. 1. Referring to the flow sheet of FIG. 1, let it be assumed that Z denotes the concentration of a target gas contained in a gas mixture being treated; F the flow rate of the gas mixture; Z* the concentration of a gas which has permeated the membrane 12 of the second separation cell 10 when converging, after feedback, with a fresh batch of a gas mixture supplied from the source 1; and F* the flow rate of a gas mixture including a feedback portion. Further, let it be assumed that $\theta_1$ represents the cut or ratio of $L_1'/L_1$ (where $L_1$ shows the flow rate of a gas which has been supplied to the first separation cell 3 and $L_1'$ indicates the flow rate of a gas permeating the membrane 5 of the first separation cell 3); and $\theta_2$ denotes a similar cut or ratio relative to the second separation cell 10. Moreover, $g_1$, $h_1$ are respectively taken to indicate the enrichment separation factor of the first separation cell 3 (a ratio of an outlet concentration of a gas enriched in the cell 3 to a concentration of a gas which has been supplied to the cell 3) and the dilution separation factor of the cell 3 (a ratio of an output concentration of a gas diluted in the cell 3 to a concentration of a gas which has been supplied to the cell 3). Similarly $g_2$, $h_2$ are taken to show the enrichment separation factor and dilution separation factor of the second separation cell 10 while $g_1$, $h_1$ and $g_2$, $h_2$ are functions of the above-mentioned cuts or ratios $\theta_1$, $\theta_2$, respectively.

Where the membranes 5, 12 of the first and second separation cells 3, 10 are alike, of the type capable of enriching the target component of a gas mixture being treated, then the concentration of a gas permeating the membrane 5 of the first separation cell 3 is indicated as $Z^*g_1$ and the flow rate of the gas $F^*\theta_1$. The concentration of a gas which has not flowed through the membrane 5 of the first separation cell 3 is denoted as $Z^*h_1$ and the flow rate of the gas as $F^*(1-\theta_1)$. The concentration of a gas permeating the membrane 12 of the second separation cell 10 is indicated as $Z^*h_1g_2$ and the flow rate of the gas as $F^*(1-\theta_1)\theta_2$. The concentration of a gas which has not passed through the membrane 12 of the second separation cell 10 is expressed as $Z^*h_1h_2$, and the flow rate of the gas as $F^*(1-\theta_1)(1-\theta_2)$. Thus, the separation factor of the first separation cell 3 may be expressed as $\alpha_1(=Z^*g_1/Z^*h_1=g_1/h_1)$, and the separation factor of the second separation cell 10 as $\alpha_2(Z^*h_1g_2/Z^*h_1h_2=g_2/h_2)$, and the overall separation factor of the entire gas mixture separator as $\alpha_{st}(=Z^*g_1/Z^*h_1h_2=g_1/h_1h_2)$. Since $h_2<1.0$, $\alpha_{st}$ is larger than $\alpha_1$. When the cut $\theta_2$ of the dilution separation cell is so chosen as to provide $g_2<\alpha_1$, then it is possible to attain $\alpha_{st}>\alpha_2$. Therefore, a gas mixture separator having both enrichment and dilution separation cells can display a larger separation factor than a gas mixture separator provided with only one separation cell.

Where the membranes 5, 12 of the first and second separation cells 3, 10 are alike, of the type capable of diluting a target gas by permeation, then the concentration of a gas permeating the membrane 5 of the first separation cell 3 is expressed as $Z^*h_1$; the flow rate of the gas as $F^*\theta_1$; the concentration of a gas which has not passed through the membrane 5 of the first separation cell 3 as $Z^*g_1$; the flow rate of the gas as $F^*(1-\theta_1)$; the concentration of a gas permeating the membrane 12 of the second separation cell 10 as $Z^*g_1h_2$; the flow rate of the gas as $F^*(1-\theta_1)\theta_2$; the concentration of a gas which has not flowed through the membrane 12 of the second separation cell 10 as $Z^*g_1g_2$; and the flow rate of the gas as $F^*(1-\theta_1)(1-\theta_2)$. Therefore, the separation factor of the first separation cell 3 may be expressed as $\alpha_1(=g_1/h_1)$; the separation factor of the second separation cell 10 as $\alpha_2(=g_2/h_2)$; and the overall separation factor of the entire gas mixture separator as $\alpha_{st}(=g_1g_2/h_1)$. When the cut $\theta_2$ of the enrichment separation cell is so chosen to realize $\alpha_1>1/h_2$, then a gas mixture separator provided with both enrichment and dilution separation cells can display a larger separation factor than a gas mixture separator fitted with only one separation cell.

The overall enrichment separation factor of the entire gas mixture separator of this invention (a ratio of a concentration of a gas enriched by the separator to a concentration of a gas mixture including a feedback portion which has been supplied to the separator) and the overall dilution separation factor of the entire gas mixture separator (a ratio of a concentration of a gas diluted by the separator to a concentration of a gas mixture including a fedback portion which has been supplied to the separator) have the undermentioned relationships with $\theta_1$, $\theta_2$, $g_1$, $g_2$, $h_1$, and $h_2$.

(a) Where a membrane used is of the type capable of enriching a target gas by permeation.

$$\text{Enrichment separation factor} = \frac{Z^*g_1}{Z^*} = \frac{\theta_1 + (1-\theta_1)(1-\theta_2)}{g_1\theta_1 + (1-\theta_1)(1-\theta_2)h_1h_2} \cdot g_1$$

$$\text{Dilution separation factor} = \frac{Z^*h_1h_2}{Z} = \frac{\theta_1 + (1-\theta_1)(1-\theta_2)}{g_1\theta_1 + (1-\theta_1)(1-\theta_2)h_1h_2} \cdot h_1h_2$$

When, therefore, the cuts $\theta_1$, $\theta_2$ are chosen to have a proper value, the gas mixture separator of this invention can attain any desired rate of enrichment and dilution.

$$\theta_1 > 1 - \frac{1}{1+(1-\theta_2)\sqrt{\frac{h_1h_2}{g_1}}} \quad \text{i)}$$

At this time, dilution is carried out at a larger rate than enrichment.

$$\theta_1 = 1 - \frac{1}{1+(1-\theta_2)\sqrt{\frac{h_1h_2}{g_1}}} \quad \text{ii)}$$

At this time, enrichment and dilution take place at an equal percentage.

$$\theta_1 < 1 - \frac{1}{1+(1-\theta_2)\sqrt{\frac{h_1h_2}{g_1}}} \quad \text{iii)}$$

At this time, enrichment is effected in a larger degree than dilution.

(b) Where a membrane used is of the type capable of diluting a target gas by permeation $$\text{Enrichment separation factor} = \frac{Z^*g_1g_2}{Z^*} =$$

-continued $$\frac{\theta_1 + (1 - \theta_1)(1 - \theta_2)}{h_1\theta_1 + (1 - \theta_1)(1 - \theta_2)g_1g_2} \cdot g_1g_2$$

Dilution separation factor $= \dfrac{Z^*h_1}{Z} =$ $$\frac{\theta_1 + (1 - \theta_1)(1 - \theta_2)}{h_1 + \theta_1 + (1 - \theta_1)(1 - \theta_2)g_1g_2} \cdot h_1$$

When, therefore, the cuts $\theta_1$, $\theta_2$ are chosen to have a proper value, the gas mixture separator of this invention can attain any desired rate of enrichment and dilution.

$$\theta_1 > 1 - \frac{1}{1 + (1 - \theta_2)\sqrt{\dfrac{g_1g_2}{h_1}}} \quad \text{i)}$$

At this time, enrichment is carried out at a larger rate than dilution. S $$\theta_1 = 1 - \frac{1}{1 + (1 - \theta_2)\sqrt{\dfrac{g_1g_2}{h_1}}} \quad \text{ii)}$$

At this time, enrichment and dilution take place at an equal percentage.

$$\theta_1 < 1 - \frac{1}{1 + (1 - \theta_2)\sqrt{\dfrac{g_1g_2}{h_1}}} \quad \text{iii)}$$

At this time, dilution is effected in a larger degree than enrichment.

FIG. 2 shows the concrete form of the first and second separation cells 3, 10 constituting the gas mixture separator of this invention. The gas separation cell comprises a cylindrical body 20 fitted with a discharge pipe 21, a cap 22 provided with a feeder 23, a cap 24 fitted with a discharge pipe 25, a large number of tubular membranes 26 axially passing through the cylindrical body and two isolating or sealing plates 29, 30 supporting a large number of tubular membranes 26 at both ends. Spaces 27, 28 defined between the caps 22, 24 and the corresponding isolating plates 29, 30 are separated in gas tightness from a space provided in the cylindrical body 20 by means of the numerous tubular membranes 26. With a gas separation cell constructed as described above, a gas mixture brought into the separator through the feeder 23 flows through the space 27 defined between the cap 22 and the corresponding isolating plate 29 into the tubular membranes 26. The gas mixture runs along the inner walls of the tubular membranes 26. Part of the gas mixture passes through the tubular membranes 26 into a space provided in the cylindrical body 20 and is taken out through the discharge pipe 21. The portion of the gas mixture which travels through the space 28 provided between the cap 24 and the corresponding isolating plate 30 is drawn off from the separator through the discharge pipe 25. While the foregoing description refers to a single separation cell, a counterpart separation cell has substantially the same construction. To meet the conditions demanded for the previously described cuts $\theta_1$, $\theta_2$, it is necessary to use tubular membranes having different effective membrane areas. The description connection with FIG. 2 refers to two separation cells constructed in the same way and disposed apart from each other. However, it is possible to arrange the separation cells in a single vessel.

FIG. 3 illustrates a 7-stage cascade arrangement of seven groups, each consisting of the aforesaid gas separator. A gas mixture being treated, which has been supplied from the source 1, has its pressure raised by a pump C-4 and is carried into the first separation cell A-4 of the fourth stage, where the gas mixture is divided into the portion which has permeated a membrane D-4 of the first separation cell A-4 and the portion which has not flowed therethrough. The gas which has run through the membrane D-4 has its pressure raised by a pump C-5 and is transferred to the first separation cell A-5 of the fifth stage. The gas which has not flowed through the membrane D-4 of the fourth stage is conducted to the second separation cell B-4 of the fourth stage, where the gas is also divided into the portion which has permeated a membrane E-4 of the second separation cell B-4 and the portion which has not traveled therethrough. A gas which has permeated through the membrane E-4 is fed back to the pump C-4. A gas which has not been carried through the membrane E-4 has its pressure raised by a pump C-3 of a third stage and is delivered to the first separation cell A-3 of the third stage. Thus a gas which has been forced through a membrane D-7 of a first separation cell A-7 of a seventh stage is drawn off in the enriched form. Conversely, a gas which has not passed through a membrane E-1 of a second separation cell B-1 of a first stage is discharged in the diluted form.

The above-mentioned cascade arrangement of separation cells uses membranes capable of enriching a target gas component by permeation. Where, however, membranes used are of the type capable of diluting a target gas component by permeation, then the enrichment and dilution sections have their arrangement reversed from the above-mentioned case. Namely, a diluted gas is taken out of the first separation cell A-7 of the seventh stage, and an enriched gas is drawn off from the second separation cell B-1 of the first stage.

As mentioned above, the gas mixture separator of this invention which comprises two separation cells and one pump may be arranged in the form of a multistage cascade. When, with this cascade arrangement of the present gas mixture separators each comprising two separation cells, proper selection is made of the kind of membrane used with the respective first and second separation cells and also of the cuts $\theta_1$, $\theta_2$ effected by the separation cells, then the cascade arrangement as a whole can have its overall separation factor prominently increased over the prior art cascade arrangement of gas mixture separators wherein each comprises a single separation cell.

For illustration, there is described the case where nitrogen and krypton constituting a mixture are separated from each other. In this case, a prior art gas mixture separator using only a silicone rubber membrane displayed a separation factor of 4.30. When using two kinds of membrane, that is, a silicone rubber membrane and a cellulose acetate membrane, the prior art separator indicated a separation factor of 4.59. In contrast, the gas mixture separators of this invention, in which the membranes of the first and second separation cells are made of silicone rubber alike and the cuts $\theta_1$, $\theta_2$ are chosen to be 0.054 and 0.67, respectively, attain as large a separation factor as 33.6, a far larger value than in the prior art gas separator.

Table I below shows the results of comparison between the cascade arrangement of gas mixture separators of this invention each comprising two separation cells and the cascade arrangement of gas mixture separators of the prior art each comprising only one separation cell.

Table I

|  | Gas separator of this invention | Gas separator of the prior art using only one kind of membrane |
|---|---|---|
| Separation factor | 33.6 | 4.30 |
| Number of stages | 9.5 | 24.3 |
| Required membrane area | 1.13 | 1.00 |
| Power consumption | 0.608 | 1.00 |

The stage numbers and power consumption given in Table I above represent those which are necessary to attain a dilution separation factor of $10^{-4}$ and an enrichment separation factor of $10^4$. The required membrane area and power consumption shown in Table I were measured with those of the prior art gas separator, taken to be 1, alike when the latter separator used a single kind of separator. Data of Table I were obtained when gases in the separation cells of the present and prior art gas separators were caused to make countercurrent flow.

Therefore, the gas separator of this invention which comprises a smaller number of cascade stages can decrease the required numbers of pumps, control devices, instruments, etc. more prominently than the prior art gas separator.

This invention will be more fully understood by reference to the examples which follow.

EXAMPLE 1

A silicone rubber tubular membrane 1 mm in outer diameter and 0.3 mm in inner diameter was used as the membrane 5 of the first separation cell 3 and the membrane 12 of the second separation cell 10 for separation of nitrogen and krypton (100 ppm) constituting a gas mixture. The membranes 5, 12 were chosen to have areas of 4.91 m² and 70.9 m², respectively. A pressure-reducing valve was so adjusted as to set the cut $\theta_1$ at 0.0437, the cut $\theta_2$ at 0.659, pressure in the high pressure chambers 4, 11 at 10 kg/cm²G, and pressure in the low pressure chambers 6, 13 at 0 kg/cm²G. The concentrations of gases and flow rates thereof in the various sections of the gas mixture separator of this invention and the overall separation factor of said separator as a whole are set forth in Table II below.

EXAMPLE 2

A polybutadiene rubber tubular membrane, 0.3 mm in outer diameter and 0.1 mm in inner diameter, was used as the membrane 5 of the first separation cell 3. A silicone rubber tubular membrane, 1.0 mm in outer diameter and 0.3 mm in inner diameter, which had the same gas-permeating tendency as the polybutadiene rubber membrane was used as the membrane of the second separation cell 10 for separation of nitrogen and krypton (100 ppm) constituting a gas mixture. The membrane 5 of the first separation cell 3 and the membrane 12 of the second separation cell 10 were chosen to have areas of 40.4 m² and 140 m² respectively. A pressure-reducing valve was adjusted to set the cut $\theta_1$ at 0.0203, cut $\theta_2$ at 0.730, pressure in the high pressure chambers 4, 11 at 10 kg/cm²G, and pressure in the low pressure chambers 6, 13 at 0 kg/cm²G. The concentrations of gases and flow rates thereof in the various sections of the gas mixture separator of the invention and the overall separation factor of the separator as a whole are presented in Table II below.

EXAMPLE 3

A silicone rubber tubular membrane, 1 mm in outer diameter and 0.3 mm in inner diameter, was used as the membrane 5 of the first separation cell and the membrane 12 of the second separation cell 10 for separation of xenon and krypton (100 ppm) constituting a gas mixture. The membrane 5 of the first separation cell 3 and the membrane 12 of the second separation cell 10 were chosen to have areas of 9.23 m² and 49.7 m², respectively. A pressure-reducing valve was adjusted to set the cut $\theta_1$ at 0.15, cut $\theta_2$ at 0.95 pressure in the high pressure chambers 4, 11 at 10 kg/cm²G, and pressure in the low pressure chambers 6, 13 at 0 kg/cm²G. The concentration of gases and flow rates thereof in the various sections of the gas mixture separator of the invention are given in Table II below.

Table II

|  | Example 1 | Example 2 | Example 3 |
|---|---|---|---|
| Concentration of a fresh batch of gas mixture Z | 100 ppm | 100 ppm | 100 ppm |
| Gas concentration (including a feedback portion) at pump inlet Z* | 242 ppm | 260 ppm | 61.5 ppm |
| Concentration of gas permeating the membrane of the first separation cell Z*g$_1$ | 731 ppm | 1298 ppm | 28.6 ppm |
| Concentration of gas which has not passed through the membrane of the first separation cell Z*h$_1$ | 220 ppm | 238 ppm | 62.0 ppm |
| Concentration of gas permeating the membrane of the second separation cell Z*h$_1$g$_1$ | 326 ppm | 321 ppm | 47.7 ppm |
| Concentration of gas which has not flowed through the membrane of the second separation cell Z*h$_1$h$_2$ | 14.1 ppm | 8.04 ppm | 326 ppm |
| Flow rate of a fresh batch of gas mixture F | 1 Nm³/hr | 1 Nm³/hr | 1 Nm³/hr |
| Flow rate of gas mixture including a feedback portion at pump inlet F* | 2.70 Nm³/hr | 3.51 Nm³/hr | 5.19 Nm³/hr |
| Flow rate of gas permeating the membrane of the first separation cell F*$\theta_1$ | 0.118 Nm³/hr | 0.0713 Nm³/hr | 0.779 Nm³/hr |
| Flow rate of gas which has | | | |

Table II-continued

| | Example 1 | Example 2 | Example 3 |
|---|---|---|---|
| not run through the membrane of the first separation cell $F^*(1-\theta_1)$ | 2.59 Nm$^3$/hr | 3.44 Nm$^3$/hr | 4.41 Nm$^3$/hr |
| Flow rate of gas permeating the membrane of the second separation cell $F^*(1-\theta_1)\theta_2$ | 1.70 Nm$^3$/hr | 2.51 Nm$^3$/hr | 4.19 Nm$^3$/hr |
| Flow rate of gas which has not flowed through the membrane of the second separation cell $F^*(1-\theta_1)(1-\theta_2)$ | 0.882 Nm$^3$/hr | 0.929 Nm$^3$/hr | 2.21 Nm$^3$/hr |
| Overall separation factor of the entire gas mixture separator | 52.0 | 154 | 11.4 |

Table II above shows that any type of gas mixture separator of this invention has a far larger gas separation factor or a prominently higher gas-separating capability than the prior art similar separator.

The foregoing description refers to the case where a mixture of nitrogen and krypton and that of xenon and krypton were separated into the respective components. However, this invention is applicable not only to these gas mixtures but any other gas mixture. Namely, this invention is well adapted to remove a target gas component from a mixture of any two or more gases selected from the group consisting of for example, $H_2$, He, $N_2$, $O_2$, air, Ne, Ar, Kr, Xe, Rn, $F_2$, $Cl_2$, $Br_2$, $UF_6$, $O_3$, $H_3$, $C_mH_n$ (hydrocarbon), $SO_2$, $C_2H_3Cl$ (vinyl chloride monomer), $C_2H_3CN$ (acrylonitrile), $NO_x$ and isotopes of said gases. Materials used as the membranes of the first and second separation cells include silicone rubber, polybutadiene rubber, polyethylene, tetramethyl pentane resin, cellulose acetate, ethyl cellulose, Nuclear Pore (trademark of a product manufactured by the General Electric Company of the United States), tetrafluoroethylene, polyester and porous metal membrane.

Further, the foregoing description refers to the case where gases made countercurrent flow in both the first and second separation cells. However, gases may pass through both separation cells in countercurrent flow, cocurrent flows, cross flow or complete mixed streams. The cuts $\theta_1$, $\theta_2$ may be controlled by adjusting, for example, a pressure-reducing valve, pressure control valve, flow control valve, or pressurization device. The membrane may be fabricated in the form of a tube, flat plate, spiral wound plate, hollow fiber, and hollow fiber which contain a porous core formed of granular or wire materials.

The second separation cell 10 of the gas mixture separator of FIG. 1 is provided with a feedback pipe for returning a gas permeating the membrane 12 of the second separation cell 10 to the inlet side of the first separation cell 3. However, the subject gas mixture separator may additionally be fitted with any of the following recycle pipes a, b, c, d (shown in broken lines in FIG. 1):

(a) a recycle pipe extending from the leadout pipe 7 to the feed pipe 15

(b) a recycle pipe extending from the discharge pipe 18 to the connection pipe 9

(c) a recyle pipe extending from the discharge pipe 18 to the feedpipe 15

(d) a recycle pipe extending from the connection pipe 9 to the feed pipe 15

It is possible to provide two of the above-mentioned recycle pipes, that is, a and b, b and c or b and d. Where the recycle pipes c and d are used, a pressure-reducing valve has to be provided for both recycle pipes c and d. Further, it becomes sometimes necessary to place a pump in the recycle pipes.

The foregoing description refers to one embodiment of this invention, shown in FIG. 1, wherein the membranes of the first and second separation cells have the same gas-permeating tendencies; an enriched or diluted gas which has permeated the membrane of the first separation cell 3 is drawn off from the low pressure chamber of the cell 3; and a gas which has not flowed through the membrane of the second separation cell 10 is discharged from the high pressure chamber of the cell 10.

There will now be described other embodiments of the invention.

A. A gas mixture separator, wherein the membranes of first and second separation cells have the same permeating tendency; a gas permeating the membrane of the first separation cell is brought into the high pressure chamber of the second separation cell; a gas which has not flowed through the membrane of the first separation cell is drawn off in the diluted or enriched form; a gas permeating the membrane of the second separation cell is discharged in the enriched or diluted form; and a gas which has not passed through the membrane of the second separation cell is returned to the inlet side of the first separation cell.

B. A gas mixture separator, wherein the membranes of the first and second separation cells have opposite gas-permeating tendencies; a gas permeating the membrane of the first separation cell is carried into the high pressure chamber of the second separation cell; a gas which has not run through the membrane of the first separation cell is taken out in the diluted or enriched form; a gas permeating the membrane of the second separation cell is fed back to the inlet side of the first separation cell; and a gas which has not flowed through the membrane of the second separation cell is removed in the enriched or diluted form.

C. A gas mixture separator, wherein the membranes of the first and second separation cells have opposite gas-permeating tendencies; a gas permeating the membrane of the first separation cell is drawn off in the enriched or diluted form; a gas which has not flowed through the membrane of the first separation cell is brought into the high pressure chamber of the second separation cell; a gas permeating the membrane of the second separation cell is taken out in the diluted or enriched form; and a gas which has not been carried through the membrane of the second separation cell is brought back to the inlet side of the first separation cell.

The above-mentioned other embodiments of this invention have been found to have as prominent a gas-separating performance as the first embodiment of FIG.

1. With any of all the foregoing embodiments, a pump may be installed between the first and second separation cells.

What we claim is:

1. A gas mixture separator which comprises a first separator cell provided with a membrane; a second separation cell similarly fitted with a membrane; a feed pipe for conducting a gas mixture being separated to a high pressure chamber of the first separation cell; a leadout pipe for drawing off a gas permeating the membrane of the first separation cell from the low pressure chamber thereof; a connection pipe for carrying a gas which has not permeated the membrane of the first separation cell from the high pressure chamber thereof to the high pressure chamber of the second separation cell; a feedback pipe for returning a gas permeating the membrane of the second separation cell from the low pressure chamber thereof to the feed pipe; and a discharge pipe for removing a gas which has not permeated the membrane of the second separation cell from the high pressure chamber thereof, each of the first and second separation cells having an inlet and two outlets at the positions which enable the gases to make countercurrent flow in the cell, and membranes of the first and second separation cells having the same gas-permeating tendencies which is further provided with a recycle pipe extending from the connection pipe to the feed pipe.

2. A gas mixture separator which comprises a first separation cell provided with a membrane; a second separation cell similarly fitted with a membrane; a feed pipe for conducting a gas mixture being separated to a high pressure chamber of the first separation cell; a leadout pipe for drawing off a gas permeating the membrane of the first separation cell from the low pressure chamber thereof; a connection pipe for carrying a gas which has not permeated the membrane of the first separation cell from the high pressure chamber thereof to the high pressure chamber of the second separation cell; a feedback pipe for returning a gas permeating the membrane of the second separation cell from the low pressure chamber thereof to the feed pipe; and a discharge pipe for revmoving a gas which has not permeated the membrane of the second separation cell from the high pressure chamber thereof; each of the first and second separation cells having an inlet and two outlets at the positions which enable the gases to make countercurrent flow in the cell, and membranes of the first and second separation cells having the same gas-permeating tendencies which is further provided with a recycle pipe extending from the discharge pipe to the connection pipe and a recycle pipe extending from the connection pipe to the feed pipe.

3. A gas mixture separator which comprises a plurality of two-celled units arranged in multi-staged series, each of said two-celled units comprising: a first separation cell provided with a membrane; a second separation cell similarly fitted with a membrane; a feed pipe for conducting a gas mixture being separated to a high pressure chamber of the first separation cell; a leadout pipe for drawing off a gas permeating the membrane of the first separation cell from the low pressure chamber thereof to the first separation cell of the next upper stage; a connection pipe for carrying a gas which has not permeated the membrane of the first separation cell from the high pressure chamber thereof to the high pressure chamber of the second separation cell; a feedback pipe for returning a gas permeating the membrane of the second separation cell from the low pressure chamber thereof to the feed pipe; and a discharge pipe for removing a gas which has not permeated the membrane of the second separation cell from the high pressure chamber thereof to the first separation cell of the next lower stage, each of the first and second separation cells having an inlet and two outlets at positions which enable the gases to make countercurrent flow in the cell, and membranes of the first and second separation cells having the same gas-permeating tendencies.

4. The gas mixture separator according to claim 3, which is further provided with a recycle pipe extending from the leadout pipe to the feed pipe.

5. The gas mixture separator according to claim 3, which is further fitted with a recycle pipe extending from the discharge pipe to the connection pipe.

6. The gas mixture separator according to claim 3, which further comprises a recycle pipe extending from the discharge pipe to the feed pipe.

7. The gas mixture separator according to claim 3, which further comprises a recycle pipe extending from the leadout pipe to the feed pipe and a recycle pipe extending from the discharge pipe to the connection pipe.

8. The gas mixture separator according to claim 3, which is further fitted with a recycle pipe extending from the discharge pipe to the feed pipe and a recycle pipe extending from the discharge pipe to the connection pipe.

9. A gas mixture separator which comprises a first separation cell provided with a membrane; a second separation cell similarly fitted with a membrane; a feed pipe for conducting a gas mixture being separated to a high pressure chamber of the first separation cell; a leadout pipe for drawing off a gas which has not permeated the membrane of the first separation cell from the high pressure chamber thereof; a connection pipe for carrying a gas permeating the membrane of the first separation cell from the low pressure chamber thereof to the high pressure chamber of the second separation cell; a feedback pipe for returning a gas permeating the membrane of the second separation cell to the feed pipe; and a discharge pipe for removing a gas which has not permeated the membrane of the second separation cell from the high pressure chamber thereof, each of the first and second separation cells having an inlet and two outlets at the positions which enable the gases to make countercurrent flow in the cell, and the membrane of the first and second separation cells having opposite gas-permeating tendencies.

10. A gas mixture separator which comprises a first separation cell provided with a membrane; a second separation cell similarly fitted with a membrane; a feed pipe for conducting a gas mixture being separated to a high pressure chamber of the first separation cell; a leadout pipe for drawing off a gas permeating the membrane of the first separation cell from the low pressure chamber thereof; a connection pipe for carrying a gas which has not permeated the membrane of the first separation cell from the high pressure chamber thereof the high pressure chamber of the second separation cell; a feedback pipe for returning a gas which has not permeated the membrane of the second separation cell from the high pressure chamber thereof to the feed pipe; and a discharge pipe for removing a gas permeating the membrane of the second separation cell from the low pressure chamber thereof, each of the first and second separation cells having an inlet and two outlets at the positions which enable the gases to make countercurrent flow in the cell, and membranes of the first and second separation cells having opposite gas-permeating tendencies.

* * * * *